Nov. 6, 1934.                L. MISONNE                1,979,397
                          PHOTOGRAPHIC APPARATUS
                             Filed June 4, 1932
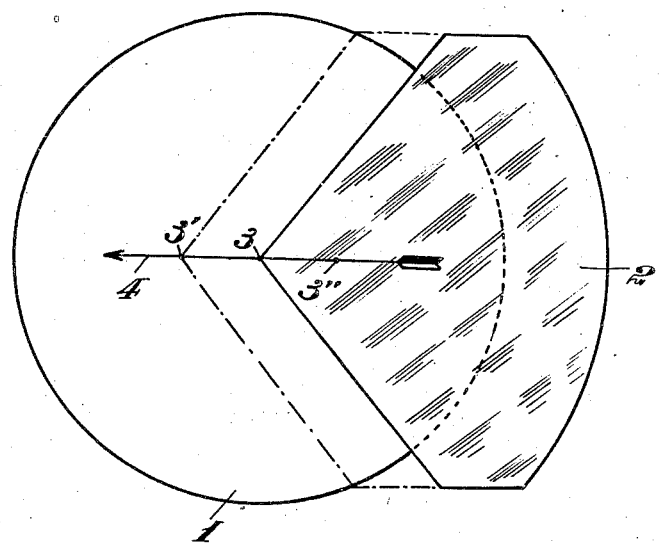
Inventor.
Leonard Misonne.
per ...
    Attorney.

UNITED STATES PATENT OFFICE 1,979,397

PHOTOGRAPHIC APPARATUS

Léonard Misonne, Gilly, Belgium

Application June 4, 1932, Serial No. 615,370
In Belgium September 1, 1931

1 Claim. (Cl. 95—81)

Rightly corrected objectives and more particularly the anastigmats produce pictures of an excessive sharpness which is often unpleasing This is the reason why anastigmats are seldom used for portrait making.

Numerous solutions have been proposed for rendering the pictures less sharp, and among these solutions especially the superposition to the objective of lenses, glasses, filters, occasioning a slight dispersion or diffusion of the light rays.

But these means necessitating accurate manufacture, are costly and have the disadvantage of producing only one degree of softness, always the same, when it would be suitable that the softness were variable for each negative, according to the nature of the subject.

This invention relates to photographic apparatus in which provision is made of one or more screens of transparent material, arranged in front of or behind the objective or between the lenses thereof, said screen or screens covering partly or entirely the objective area and having a diffusion effect on the light rays, for the purpose of correcting excessive sharpness in the photographic negative.

In order to attain this result, it is sufficient to add to the objective a strip of glass, celluloid or any other transparent substance which somewhat diffuses the light rays, owing either to imperfect truing of its sides or to an embossing or corrugation of same, or else to a lack of homogeneousness of the material, or in any other way.

This strip may be inserted either between the lenses of the objective or else in front of or behind the same. However, it seems that the optical center or its immediate neighbourhood is the appropriate region.

This strip generally covers only a part of the objective area, leaving the other part free to form a normal picture. On this normal and sharp picture, the soft picture, produced by means of the strip will be superposed. A sharp but hazy picture is then obtained, giving a very flattering effect, which greatly differs from the softness due to a lack of focussing. In the case of a portrait, such a picture can most frequently dispense with the retouching.

Every kind of form or shape may be given to this strip; it may be a kind of diaphragm with a circular, rectangular or starred central hole, or any other kind. It seems however that the most interesting form is that of a sector, the apex of which would superpose itself to the center of the objective circle. The angle can vary within large limits, but the most effective angles seem to be comprised between 90° and 180°.

The use of the strip presents the following advantages:

This device is simple and of insignificant cost. A window glass of coarse manufacture can very well procure the required result.

Further it is possible, when the strip has the shape of a sector, to vary the diaphragm aperture without modifying the ratio of sharpness to softness.

It is possible to vary this ratio by more or less inserting the strip in the objective. If for example the strip has 120°, the apex being right in the center of the objective, a ratio of softness of ⅓ will be obtained. But it will be easy, by further or less inserting of this sector, to bring the diffusing surface to ½ or ¼ or to any other ratio and eventually to completely cover the objective area.

The cost of the strips being nearly naught and their dimensions very small, it will be easy to compose, at an insignificant cost, a set of very reduced dimensions, comprising strips not only differing in their angles, but principally in their diffusion power, two strips of the same angle (for example 90°) possibly having diffusion faculties varying to a very large extent, owing to their different structure.

The edges of these strips wi'l have to be covered with black and dull varnish, in order to prevent refractions or reverberations, which might be cause of screening. This varnish might be replaced, especially for large dimensions, by a thin frame of blackened metal, which would only occasion an insignificant loss of luminosity to the objective.

The strip will be inserted in the objective through a slot provided in the tube around the half of its circumference or approximately. The slot must be wide enough, in order to allow the strip to enter without difficulty. The strip must be sufficiently long so as not to enter completely into the objective. If it has the shape of a sector, its radius must at least be greater with ⅓ than the radius of the objective. This will allow it to be inserted further than the concentric position. Moreover, the outer part will render manipulation easier. Finally, it will permit the use of a guide fitted at the exterior of the objective tube, this guide being necessary to maintain the strip at right angles to the optical axis. This guide might also maintain the fixed strip in any position whatever.

If the strip is to be used in front or behind the objective, it may be held so as to glide in a metal frame such as used for sky screens.

In the accompanying figure, a diagrammatic front view is given of an objective aperture 1 fitted with a screen having a sector-shape. The strip is shown in 2 and is in its normal position, the apex 3 of the sector being superposed to the center of the objective. The arrow 4 indicates the direction in which the strip is guided and is moved, so that its apex will occupy positions such as 3' and 3".

I claim:

A device for correcting excessive sharpness of images produced by photographic lenses, comprising a thin sector-shaped light-diffusing screen, slidably mounted upon the lens mount to vary the area of the lens covered by the diffusing screen to produce varying degrees of sharpness of image, the radius of the sector being not less than one third the radius of the lens.

LÉONARD MISONNE.